United States Patent
Jhumra et al.

(12) 
(10) Patent No.: US 6,238,127 B1
(45) Date of Patent: May 29, 2001

(54) PIVOT APPARATUS INCLUDING A FASTENER AND BUSHING ASSEMBLY

(75) Inventors: Khusro M. Jhumra; Raymond C. Scherer, both of Fremont, CA (US)

(73) Assignee: Western Sky Industries, Inc., Philadelphia, PA (US)

( * ) Notice: Subject to any disclaimer, the term of this patent is extended or adjusted under 35 U.S.C. 154(b) by 0 days.

(21) Appl. No.: 09/213,349

(22) Filed: Dec. 17, 1998

(51) Int. Cl.$^7$ .................................................... F16D 13/04
(52) U.S. Cl. ....................... 403/282; 403/154; 403/408.1; 384/295
(58) Field of Search ...................................... 384/295, 296; 411/383, 546, 903, 502, 386, 171; 403/282, 354, 408.1, 150, 154, 155, 158, 161

(56) References Cited

U.S. PATENT DOCUMENTS

| | | |
|---|---|---|
| 714,950 | 12/1902 | Richards . |
| 726,378 | 4/1903 | Tucker . |
| 1,031,410 | 7/1912 | Alexander . |
| 1,500,021 * | 7/1924 | Wilson ................................ 411/502 |
| 3,033,624 | 5/1962 | Biesecker . |
| 3,099,057 | 7/1963 | Cook . |
| 3,193,335 | 7/1965 | Wing . |
| 3,247,752 | 4/1966 | Greenleaf et al. . |
| 3,350,976 * | 11/1967 | Topf .................................... 411/502 |
| 3,361,459 | 1/1968 | Marquis et al. . |
| 3,385,158 | 5/1968 | Morin . |
| 3,393,599 * | 7/1968 | Fisher ............................... 403/408.1 |
| 3,438,686 | 4/1969 | Stone . |
| 3,768,115 | 10/1973 | Hoffman et al. . |
| 3,829,184 | 8/1974 | Chevret . |
| 3,908,477 * | 9/1975 | Teske et al. ..................... 403/154 X |
| 3,999,583 | 12/1976 | Nelson . |
| 4,363,580 | 12/1982 | Bell . |
| 4,435,100 * | 3/1984 | Cox ................................. 403/161 X |
| 4,445,594 | 5/1984 | Hoffman, Jr. . |
| 4,621,961 | 11/1986 | Gulistan . |
| 4,684,280 * | 8/1987 | Dirkin et al. ..................... 403/161 X |
| 4,766,980 * | 8/1988 | Engle .............................. 403/161 X |
| 4,788,736 * | 12/1988 | Arai et al. ....................... 403/155 X |
| 4,924,533 | 5/1990 | Stairs . |
| 4,975,008 | 12/1990 | Wagner . |
| 5,018,920 | 5/1991 | Speakman . |

(List continued on next page.)

FOREIGN PATENT DOCUMENTS

648772 * 7/1937 (DE) ....................................... 411/34

OTHER PUBLICATIONS

U.S. application No. 08/916,515, Jhumra et al., filed Aug. 22, 1997.
Bushing Installation Instructions.
Western Sky Industries, Bushing WSI B–8AST, Drawing #2055375.
WSI Technologies, Bushing and Bolt Assembly, Drawing #2055400.

*Primary Examiner*—Lynne H. Browne
*Assistant Examiner*—John R. Cottingham
(74) *Attorney, Agent, or Firm*—Harness, Dickey & Pierce P.L.C.

(57) ABSTRACT

A fastening assembly for use as a pivot joint for a first member and a second member which have alignable openings therethrough. The fastening assembly comprises a fastener having a longitudinal axis and a bushing mounted on the fastener with the bushing having a first end and a second end. The second end of the bushing being formed wherein upon the combined fastener and bushing being mounted within the aligned openings the second bushing end extends only through the opening of the first member whereby upon its engagement with the second member during installation it flares radially outwardly from the longitudinal axis of the fastener and between the first and second members thereby providing automatic retention of the bushing and, resilient spacing between the first and second members.

42 Claims, 6 Drawing Sheets

U.S. PATENT DOCUMENTS

| | | | |
|---|---|---|---|
| 5,065,490 | * | 11/1991 | Wivagg et al. ...................... 29/402.1 |
| 5,106,225 | * | 4/1992 | Andre et al. ...................... 403/408.1 |
| 5,252,014 | * | 10/1993 | Andrews ...................... 403/408.1 X |
| 5,259,689 | * | 11/1993 | Arand et al. ...................... 411/502 X |
| 5,419,667 | * | 5/1995 | Avgoustis ............................. 411/386 |
| 5,704,752 | * | 1/1998 | Logerot ............................. 411/502 X |
| 5,735,021 | | 4/1998 | Briggs . |
| 5,855,460 | * | 1/1999 | Brehmer et al. ................. 411/383 X |
| 5,893,694 | | 4/1999 | Wilusz et al. . |

\* cited by examiner

_Fig-5_

_Fig-7_

PIVOT APPARATUS INCLUDING A FASTENER AND BUSHING ASSEMBLY

SUMMARY—BACKGROUND OF THE INVENTION

The present invention relates generally to a pivot apparatus including a fastener and bushing assembly for pivotally connecting pivotable members such as for reclinable seat assemblies and the like.

With regard to such seat assemblies, the fastener and bushing assemblies of the pivot apparatus of the present invention are mountable within aligned openings of pivot plates or brackets to inhibit metal to metal engagement which could cause wear and undesirable noise such as squeaking and rattling.

Typically, reclinable seat assemblies have a seat bottom and a seat back pivotable from between selected upright and reclined positions relative to the seat bottom. A releasable latch type mechanism is provided for selectively maintaining the seat back in the upright or one or more reclined positions. The seat bottom and seat back have pivot members such as plates or brackets mounted thereon with each of such pivot members having at least one opening formed therein. The opening in the seat back pivot member is generally a smooth hole while the seat bottom pivot member opening is generally a threaded hole; the openings are alignable for receiving a fastener such as a threaded bolt or the like. Upon release of the latch mechanism, the seat back can be pivoted about the bolt relative to the seat bottom between reclined and upright positions.

Previously, the bolt or the like was inserted into the aligned openings and the seat back pivot member was pivotally supported upon the bolt with direct metal to metal engagement. Subsequent improvements provided a non-metallic bushing to be mounted about the bolt and within the opening of the pivot member of the seat back to allow it to pivot smoothly about the bolt mounted bushing. While assisting in maintaining a generally smooth and even reclinability of the seat back such assemblies could require additional components to provide wear resistance and noise insulation. Such assemblies would not necessarily maintain complete separation and inhibit axial movement between the pivot members which could result in wear of the bushing and/or engagement of the pivot members. In addition such assemblies could require multiple assembly steps.

In one such improvement a non-metallic bushing is provided with an outer end which extends through an opening in one or more members and is adapted to be upset or flipped radially outwardly by a special tool whereby it would be self-retaining and locked to the one or more members. See in this regard U.S. Pat. No. 4,363,580 issued Dec. 14, 1982 for "Self-Retaining Close Tolerance Bushing". Where such bushings are to be used as pivot apparatus, the associated bolt would be inserted into the bushing after the upsetting step.

Thus it would be advantageous to provide a pivot apparatus including a fastener and a bushing in which the bushing provides a structure which can be installed in assembly with an associated bolt to members for pivotal movement and thus does not require a separate step to install the bolt to provide the final assembly.

In this regard it would also be advantageous to provide such a pivot apparatus in which the bushing would automatically locate and resiliently hold itself in a desired position relative to the members to be pivotally secured.

It would be advantageous to provide a pivot apparatus including a fastener and bushing assembly which minimizes wear, noise and degradation to the bushing. It would also be advantageous to provide a fastener and bushing assembly which is easy to manufacture and install with minimum installation steps. At the same time it would be advantageous to provide a bushing which when fixed with the mating bolt would resiliently maintain the pivotal members in a desired spaced relationship while permitting the desired pivotal action.

The pivot apparatus of the present invention addresses the preceding objectives. Thus the fastener and bushing assembly of the present invention comprises a bolt like fastener having a longitudinal axis and a resilient, cylindrical bushing frictionally mounted about the fastener with the bushing having an inner pivot support portion and an outer resilient spacer portion. The outer spacer portion of the bushing is formed with at least one axially extending slot wherein upon mounting the bolt and bushing assembly within the aligned openings of the first and second pivot members, the outer end of the bushing upon engaging a surface of one of the pivot members will be flared radially outwardly from the longitudinal axis of the bolt and between the first and second pivot members to provide a resiliently variable length of the bushing to compensate for tolerance variations in the axial distance or spacing between the pivot members. At the same time the flared outer end wall resiliently inhibits relative axial movement of the bushing and movement between the pivot members while resiliently maintaining them spaced from contact with each other.

In the present invention, the bushing has a main bushing support portion extending from a flanged inner end of the bushing and a resilient, bushing spacer portion at the outer end of the bushing. In one form of the invention, the main bushing portion has an outer diameter greater than the outer diameter of the extended bushing spacer portion.

In one form of the present invention, a pair of diametrically opposite axial slots are formed in the bushing spacer portion to define a pair of finger like sections. Each slot terminates at the outer end in a first slot side and a second slot side. In this embodiment the outer edge of the finger like sections extends circumferentially somewhat helically inwardly from the first slot side of one slot to the second slot side of the other slot. Thus the edge at the first slot sides extends axially farther than the edge at the second slot side. As will be seen, in this way, in installation, the edges at the first slot sides will engage the confronting surface on the pivot member before the edge at the second slot sides thereby facilitating the radial outward flaring of the finger like sections. This results in the formation of a flared end surface in smooth, resilient contact with the engaged surface of the related pivot member to thereby restrain relative axial movement of the bushing and of the pivot members towards each other. At the same time the flared end surface provides a means to resiliently compensate for dimensional tolerance variations in the spacing between the pivot members while automatically positioning and securing the bushing in the desired location. At the same time this is accomplished with little variation in the magnitude of the installation load. Preferably, the slots extend substantially parallelly to the longitudinal axis of the fastener and are of a length to permit the desired flaring.

It should be understood that the bushing could have a single slot or more than two slots formed therein.

In one form of the present invention, the fastening assembly comprises a plurality of axially extending, resilient ribs formed along the outer surface of the main bushing portion with at least a part of the ribs having an outer diameter greater than the diameter of the associated one of aligned openings. Preferably, the plurality of ribs are equally circumferentially spaced. The ribs are elastically deformable upon insertion into the associated opening to thereby compensate for dimensional variations while providing a relatively snug fit.

In one form of the present invention, the bushing is constructed from a resilient thermoplastic material. Thus when the ribs are under compression, the material comprising the ribs is deformable to an area between the ribs absorbing any manufacturing tolerances within the openings to provide a relatively snug fit.

In one form of the present invention the bushing and bolt are constructed to pivotally support two pivot members comprising a single plate each while in other forms the bushing and bolt are constructed to pivotally support two pivot members comprising multiple, spaced plates.

Furthermore in another feature of the present invention, the bushing maintains relative longitudinal positioning with the fastener upon mounting of the bushing onto the fastener and the bushing withstands at least a three (3 lb.) pound static load applied to either the bushing or the fastener in a longitudinal direction to facilitate handling prior to and during installation and to inhibit relative rotation after installation.

The present invention further includes a method for pivotally fastening a first pivot member to a second pivot member with a fastener and bushing assembly of the type of the present invention. The first and second members have alignable apertures therethrough with the aligned apertures adapted to receive the fastener and bushing assembly whereby the pivot members are supported for pivotal movement relative to each other.

The method of the present invention comprises providing a fastener having a longitudinal axis and a bushing having an inner portion and an outer portion. The bushing is tightly mounted on the fastener. At least one axial slot is formed in the bushing extending inwardly from the outer end of the bushing. The fastener and bushing assembly is mounted within aligned openings of first and second pivot members. The method comprises forming the outer end of the bushing to be self-flaring generally radially outwardly from the longitudinal axis of the fastener upon engagement with one of the pivot members and between the first and the second pivot members thereby resiliently inhibiting relative axial movement of the bushing and between the first and second members while permitting relative rotation between the pivot members.

The method further comprises providing a bushing with one or more slots each having a first slot side and a second slot side, and providing an outer circumferential edge at the outer end of the bushing from the first slot side to the second slot side which extends generally helically whereby the first slot side will have an axial length greater than that of the second slot side to facilitate flaring upon installation.

Another feature of the method of the present invention is providing a fastener and bushing assembly which maintains relative axial positioning between the bushing and the fastener upon mounting of the bushing onto the fastener such that the bushing can withstand at least a three (3 lb.) pound static load applied to either the bushing or the fastener in an axial direction while maintaining such positioning whereby handling of the assembly prior to and during installation is facilitated and relative rotation therebetween is inhibited.

Therefore, it is an object of the present invention to provide a fastener and bushing assembly for pivotally supporting a pair of pivot members while maintaining axial spacing or separation between the pivot members.

It is another object of the present invention to provide such a fastener and bushing assembly in which the bushing has a deformable portion which upon assembly deforms to provide a structure for maintaining axial spacing between the pivot members.

It is an object of the present invention to provide such a fastener and bushing assembly in which the bushing has a deformable portion which upon assembly deforms to provide a resilient structure for compensating for dimensional tolerance variations in the spacing between pivot members.

It is still another object of the present invention to provide a method of pivotally securing two members together whereby the axial spacing between the pivot members is resiliently maintained and engagement of the pivot members is inhibited.

It is another object of the present invention to provide a method of pivotally securing two members together with minimal installation steps.

It is a general object of the present invention to provide a unique assembly for pivotally securing two members together.

Other objects, features, and advantages of the present invention will become apparent from the subsequent description and the appended claims, taken in conjunction with the accompanying drawings, in which:

DESCRIPTION OF EMBODIMENTS OF THE INVENTION

Figure 1:
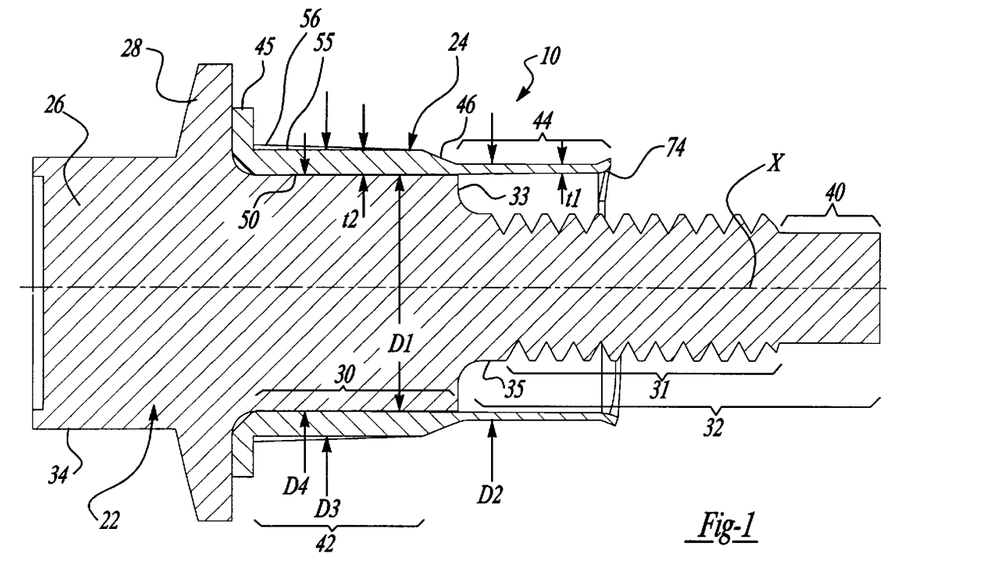
FIG. 1 is a side elevational, sectional view of one form of the fastener and bushing assembly of the present invention for pivotally securing two members such as reclining seat backs and the like constructed according to the present invention.
Figure 3:
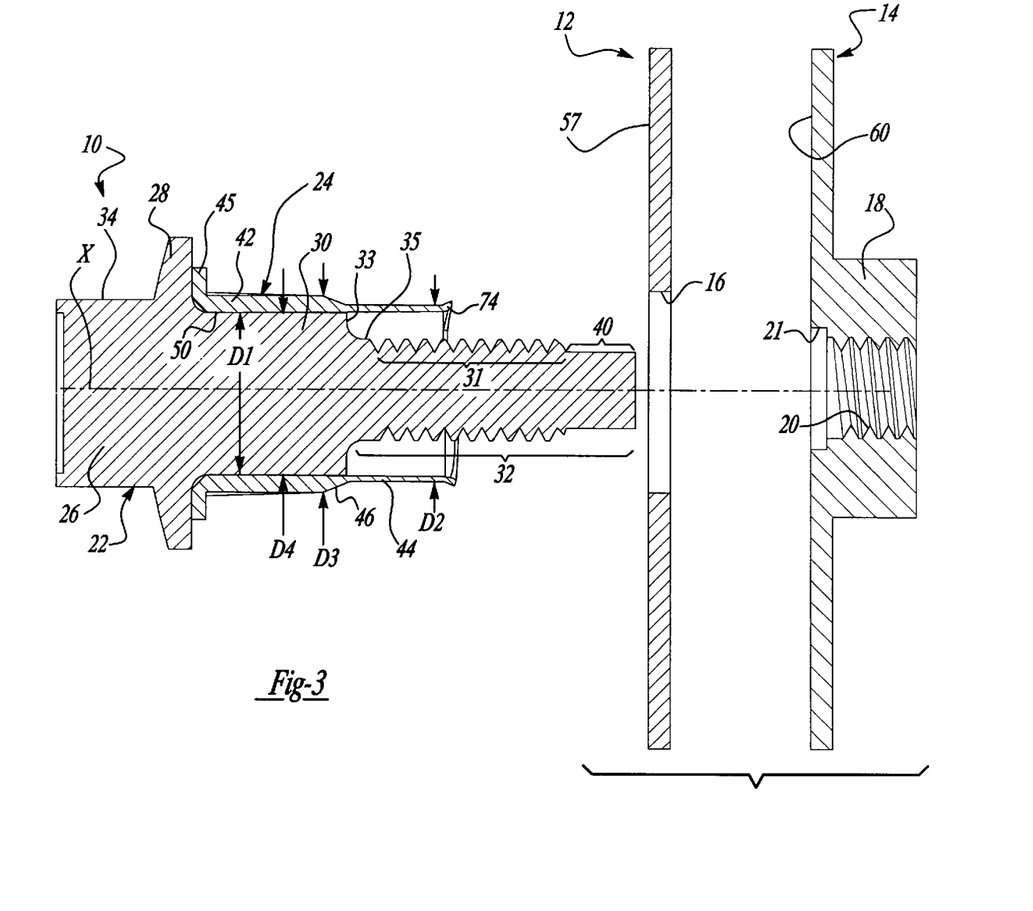
FIG. 3 is a side elevational, sectional view of the fastener and bushing assembly of FIGS. 1 and 2 shown relative to two members to be pivotally secured together.

Looking now to FIGS. 1 and 3, a fastener and bushing assembly 10 is shown for pivotally securing a pair of members such as those for reclining seat backs of a seat assembly (not shown) and the like. The reclining seat backs are typically part of a seat assembly having a seat bottom and with the seat back and bottom each having a pivot support member such as pivot members 12 and 14, illustrated in FIGS. 3–5, mounted thereon. Typically one of the pivot support members such as pivot member 12 has a punched, drilled or extruded smooth opening 16 while the other member such as pivot member 14 has a boss 18 with a threaded opening 20 and enlarged counterbore 21 at the receiving end. The pivot member 12 of the one member, such as a seat back, is secured to the pivot member 14 of the second member, such as seat bottom, by aligning the openings 16 and 20 and inserting the fastener and bushing assembly 10 therethrough about which the support member 12 pivots which in the case of a seat back is pivotable between reclining and upright positions. Seat assemblies as described are typically present in many automobile seat applications today but can also be found in other seat applications including, but not limited to, those in airplanes, trains, buses, homes, offices, etc.

Referring now to FIG. 1, the fastener and bushing assembly 10 of the present invention includes a fastener 22 and a bushing 24. The fastener 22 preferably is a threaded fastener such as a bolt; however, other types of fasteners including, but not limited to, a non-threaded pivot pin or rod are within the scope of the present invention. The fastener 22 as shown is of a shoulder bolt type having a longitudinal axis X with a head portion 26 with an enlarged diameter flange 28. A substantially cylindrical smooth shank, support portion 30 extends outwardly from the flange 28 and a substantially cylindrical threaded shank portion 32 extends outwardly from the shank support portion 30. The shank support portion 30 is of a greater diameter than the threaded portion 32 whereby a stepped construction is provided defining an inner bolt shoulder 33.

Preferably, the fastener 22 is of a one piece construction made of a metal such as SAE 4037 steel. The fastener 22 can be formed by standard procedures such as cold heading with the threads being roll formed. It should be noted, however, that the fastener 22 could be constructed from separate pieces and/or from other rigid materials including other metals (i.e., aluminum, titanium, etc.), plastics, ceramics, etc.

The head portion 26 of the fastener 22 has a hexagonally shaped outer surface 34 to facilitate being gripped by a standard hex socket tool or the like to assist in threadably securing the threaded shank portion 32 with the threaded opening 20 of the pivot member 14. Alternatively the head portion 26 could be provided with a hex or star shaped bore to be installed by a standard hex or star bit tool.

The threaded portion 32 of the fastener 22 includes a threaded section 31 and terminates at its outer end in a smooth unthreaded, reduced diameter section 40. The reduced diameter section 40 provides clearance with the thread of bore 20 while facilitating insertion of the threaded section 31 into the threaded bore 20 of the pivot member 14. An unthreaded section 35 connects the opposite end of the threaded shank portion 32 to bolt shoulder 33.

The bushing 24 is preferably a plastic member constructed by an injection molding process from a durable moldable resilient plastic (i.e. Polyamide, Acetal, Polyethelene, etc.) or other resin material. In one form, the bushing 24 was made of a plastic material designated as ZYTEL ST801 BK010. ZYTEL is a trademark of E. I. DuPont DeNemours and Company for a Nylon 6/6 type resin. It should be noted, however, that the bushing 24 could be constructed from other non-metallic durable resilient materials and processes including, but not limited to thermosetting materials (i.e., rubber) formed by other manufacturing processes. While the bushing 24 is preferably of a one piece molded construction it could be constructed from separate pieces.

The bushing 24 is preferably a substantially hollow, generally cylindrical member having a through bore 50 of generally uniform diameter D1. The bushing 24 has a main bushing support portion 42 at its inner end which is connected to a bushing spacer portion 44 at its outer end. The main bushing portion 42 has a flange 45 at its inner end. The bushing spacer portion 44 is of a reduced outside diameter D2 relative to the larger outside diameter D3 of the main bushing portion 42 and is connected thereto by a tapered transition section 46. Thus the wall thickness t1 of the bushing spacer portion 44 is less than wall thickness t2 of bushing support portion 42. The wall thickness t1 of the bushing spacer portion 44 is selected to facilitate flaring, as will be described, while the greater wall thickness t2 of bushing support portion 42 is selected to provide adequate strength to accept the bearing loads from the associated pivot member 12.

Figure 1A:
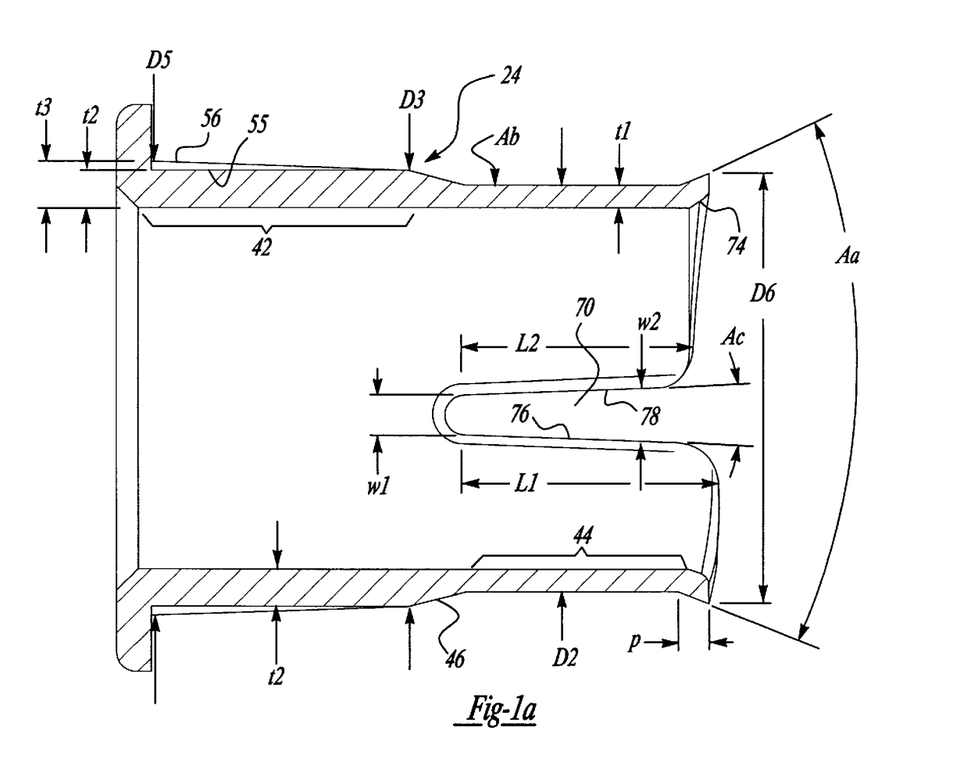
FIG. 1a is a side elevational, sectional view of the bushing of FIG. 1 with the section taken just adjacent to ribs formed on the main bushing support portion.
Figure 2:
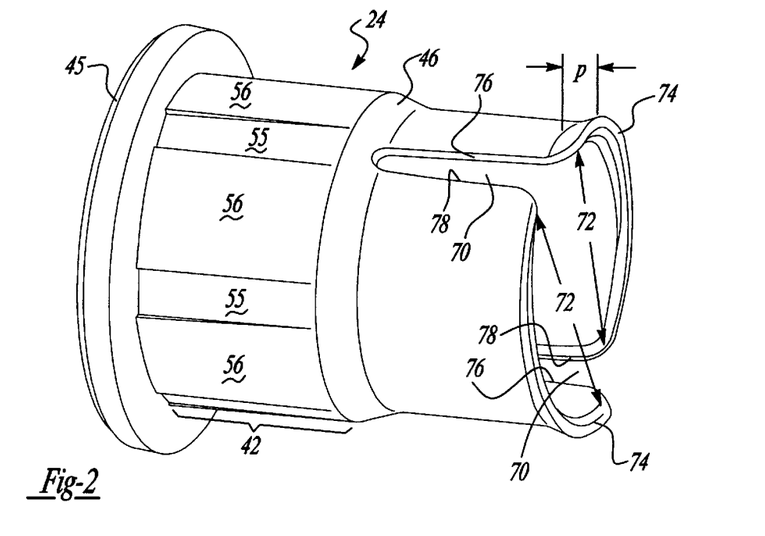
FIG. 2 is a pictorial view of the bushing of FIG. 1.

Looking now to FIGS. 1A and 2 the bushing spacer portion 44 has a pair of axially extending, diametrically opposed slots 70 dividing the spacer portion 44 into two generally semi-cylindrical finger like sections 72. The outer ends of the finger sections 72 terminate in radially outwardly angulated or flared lips or edges 74. The finger sections 72 are inclined radially outwardly from the transition section 46 at a slight included angle Ab whereby the outside diameter D2 will increase slightly from the transition section 46 to the beginning of the lips or edges 74. The lips or edges 74 are angulated to flare radially outwardly to a larger diameter D6. The lips or edges 74 also extend helically with the helical contour resulting in each of the slots 70 having a first slot side 76 and a second slot side 78 with the first slot side 76 extending axially for a length L1 which is greater than the axial length L2 of the second slot side 78. In this regard, the pitch P of the helical contour is approximately twice the distance of L1–L2, i.e. P=2(L1–L2). At the same time the slot sides 76 and 78 also extend axially outwardly equiangularly to define an included angle Ac. Thus the width of the slots 70 increases from a width W1 at their inner ends to a width W2 at their outer ends. In this regard since the pitch P is to be measured for 360° circumferentially from the first slot side 76 and since the slot sides 76 and 78 are circumferentially separated by slot 70, the actual pitch P will be somewhat greater than twice the distance of L1–L2 (see FIGS. 1A and 2). The above construction facilitates each of the finger sections 72 in flaring radially outwardly and peeling axially rearwardly during installation as the flared edges 74 gradually engage the confronting surface 60 from the end of the first slot side 76 at one of the slots 70 to the second slot side 78 at the other slot 70. In addition, the slight angle Ab of inclination of finger sections 72 also facilitates molding of the bushing 24.

To assemble the fastener 22 and bushing 24 of the present invention, the fastener 22 is inserted into the bore 50 of bushing 24 with the bolt flange 28 in engagement with the bushing flange 45. Preferably, the diameter D1 of bore 50 especially in the main bushing portion 42 is slightly less than the diameter D4 of the fastener shank support portion 30 such that the bushing 24 is press-fitted onto the fastener support portion 30 of the fastener 22 with a tight interference or frictional fit to inhibit loose, undesired rotation of the bushing 24 about the fastener support portion 30. At the same time, the magnitude of interference of the press fit is provided such that the bushing 24 can withstand at least a three (3 lb.) pound static load along the longitudinal axis X of the fastener 22 without shifting or otherwise changing its axial position in relation to the fastener 22. This facilitates handling of the fastener and bushing assembly 10 during installation and also inhibits rotation of the bushing 24 relative to the fastener 22 when the pivot member 12 is pivoted relative to the pivot member 14.

The axial length of the fastener support portion 30 is generally no less than the combined axial length of the main bushing portion 42 and bushing flange 45. As will be seen, in this way engagement of the bolt shoulder 33 with the confronting surface 60, of the pivot member 14 can occur upon installation of the fastener and bushing assembly 10 with the radially outwardly flaring of the bushing spacer portion 44 to be described.

Looking now to FIGS. 1a and 2 the bushing support portion 42 preferably has a plurality of axially extending, equally circumferentially spaced ribs 56 formed along its outer surface. The ribs 56 are tapered from a point adjacent the transition section 46 at the diameter D3 of the untapered sections 55 to a larger diameter D5 at a point adjacent the inner end at the bushing flange 45. At the same time the ribs 56 will increase in thickness from t2 at the beginning diameter D3 to t3 at the end diameter D5. In one form of the bushing 24, six tapered ribs 56 were provided although it is understood that more or less than six ribs 56 could be utilized depending upon the specific application.

The fastener and bushing assembly 10 is mounted to the pivot members 12 and 14 via the aligned openings 16 and 20 of the pivot members 12 and 14.

Figure 4:
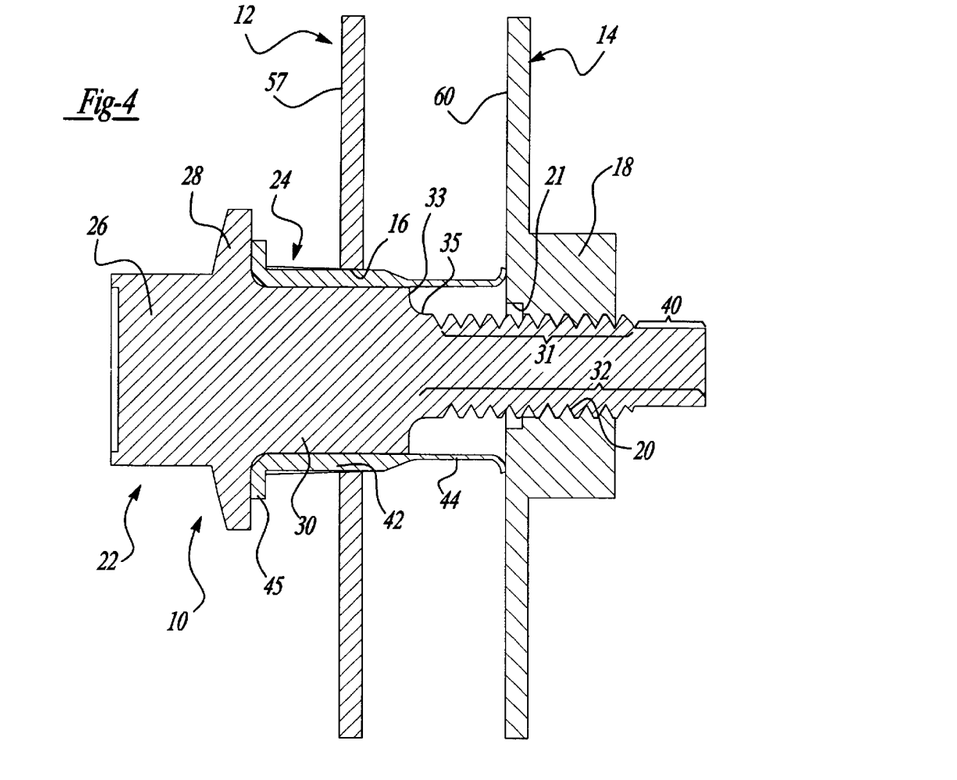
FIG. 4 is a sectional view similar to FIG. 3 showing the initiation of flaring of the bushing upon initiation of assembly of the fastener and bushing assembly with the two pivot members.

Looking now to FIG. 4, the threaded shank portion 32 of fastener 22 and the bushing spacer portion 44 are moved through the smooth bore 16 of pivot member 12. The diameter D6 of the inclined edges or lips 74 is less than the diameter of smooth bore 16 and hence are moved therethrough in a clearance relationship. At the same time, as previously noted, the reduced diameter section 40 of the fastener 22 facilitates piloting the threaded portion 32 into the threaded bore 20 and thereby initiation of threaded engagement between the threads of the threaded section 31 and the threaded bore 20.

As the fastener 22 is threaded into the threaded bore 20, the main bushing support portion 42 of the bushing 24 is moved farther into the smooth bore 16 of the pivot member 12. The initial outside diameter D3 of the ribs 56, is no greater than the diameter of the smooth bore 16. However, the diameter D5 is greater than the diameter of the smooth bore 16; thus as the ribs 56 are moved farther into the bore 16 an interference is developed such that when the bushing flange 45 engages the outer surface 57 of the pivot member 12 the interference provides a snug fit of the ribs 56 with the bore 16. Once secured within the opening 16 of the pivot member 12, the ribs 56 of the bushing 24, being formed of a resilient, plastic material, are under compression and flow into the untapered sections 55 between the ribs 56 thereby absorbing any manufacturing tolerances existing in the opening 16 of the pivot member 12 while providing a snug fit. In this regard the wall thickness t2 is of the untapered section 55.

However, the resilience of the plastic material of the bushing 24 and its inherent lubricity will still permit the pivot member 12 to be selectively pivoted about the bushing support portion 42 without the need for excessive force and with minimal wear between the bushing support portion 42 and the bore 16 of pivot member 12.

As illustrated in FIG. 4, as the fastener and bushing assembly 10 is moved relative to the aligned openings 16 and 20, the bushing spacer portion 44, due to the diameter D6 of inclined edges 74 being greater than the diameter of the threaded opening 20, the inclined edges 74 will engage the confronting surface 60 of the pivot member 14 at an area spaced radially outwardly from the threaded opening 20. As this occurs, the tapered, helically extending outer edges 74 will engage the surface 60 and the relative axial compressive force applied to the bushing 24 will cause the helical edges 74 and the slots 70 formed in the spacer portion 44, to flare radially outwardly from the axis of the fastener 22 between the pivot members 12 and 14. The initiation of flaring is shown in FIG. 4. The threaded section 31 of fastener 22 is threaded farther into the threaded bore 20 until the bolt shoulder 33 engages the surface 60 of the pivot member 14. At this point the installation is completed and the bushing spacer portion 44 is fully flared (see FIG. 5). In this regard the depth of the counterbore 21 in bore 20 is selected to permit engagement of the bolt shoulder 33 with the surface 60 while preventing the unthreaded section 35 of the threaded shank portion 32 from engaging the threads of bore 20. The radially outward flaring of the bushing spacer portion 44 creates a resilient, washer-like structure 62 between the pivot members 12 and 14 which resiliently engages the surface 60. At the same time the flared contour of the washer-like structure 62 extends arcuately away from the surface 60 whereby a space or gap is provided between the flared lips or edges 74 and the surface 60. Thus this space or gap creates an area in addition to the wall thickness of the spacer portion 44 to separate the pivot members 12 and 14 while at the same providing resilient resistance against engagement of the pivot members 12 and 14.

Figure 5:
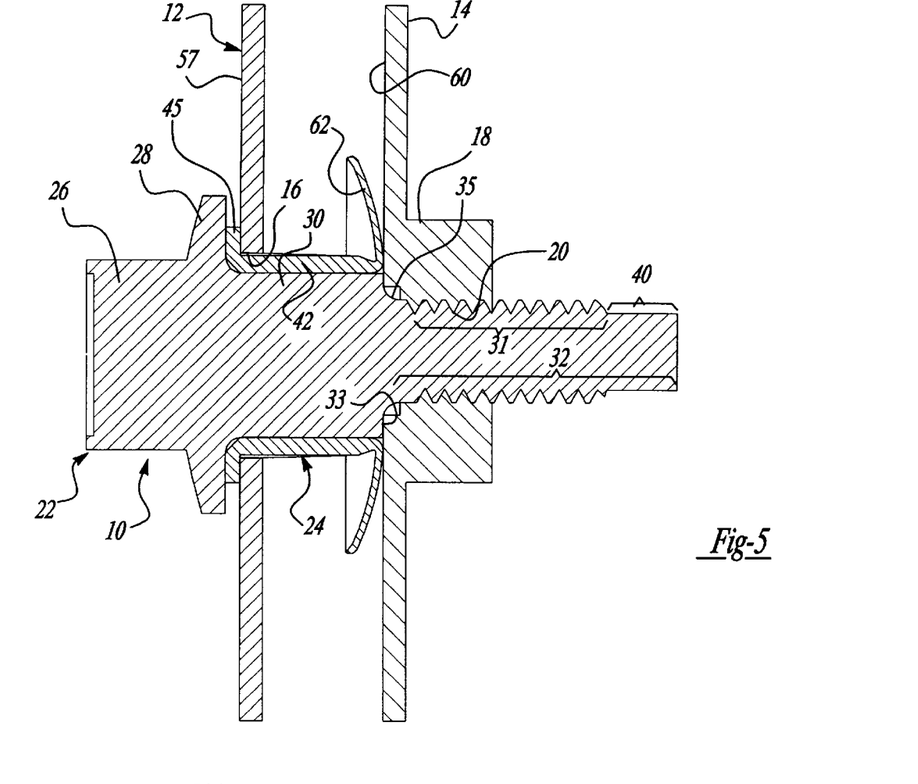
FIG. 5 is a view similar to FIGS. 3 and 4 showing the fastener and bushing assembly as fully assembled and pivotally securing the two pivot members together with the bushing fully flared.

Thus it can be seen that the resultant resilient, washer-like structure 62 will bias the bushing 24 to maintain a fixed position between the pivot members 12 and 14. In this regard, the resilient washer-like structure 62 provides a means to resiliently compensate for dimensional tolerance variations in the spacing between the pivot members 12 and 14 while automatically positioning and securing the bushing 24 in the desired location. At the same time this is accomplished with little variation in the magnitude of the installation load on the fastener 22. Preferably, the slots extend substantially parallelly to the longitudinal axis of the fastener and are of a length to permit the desired flaring. In addition, in the event dimensional tolerances preclude the bolt shoulder 33 from engaging the surface 60, the resilient bias created by the washer-like structure 62 will maintain its position between the pivot members 12 and 14 while also biasing the pivot members 12 and 14 to maintain their spaced relationship.

In this regard the resilient bias created by the washer-like structure 62 will also assist in maintaining loading between the engaged threads of the threaded fastener portion 32 and the threaded bore 20 to inhibit loosening.

In addition the engagement of the opening 16 of pivot member 12 with the ribs 56 of the main bushing portion 42, the engagement of pivot member 12 with bushing flange 45, the resilient engagement of the washer-like structure 62 with the surface 60 of pivot member 14 and the lubricity of the plastic material inhibits squeaking, rattling and the like.

One example of the invention of the fastener and bushing assembly 10 constructed of the materials previously noted, was as follows:

| Fastener 22 | |
| --- | --- |
| Diameter | |
| Fastener Support Portion 30 D4 | 12.90 mm/.507 in. |
| Thread Form | |
| Threaded Section 31 | M8 × 1.25 |
| Bushing 24 | |
| Angle | |
| Edges 74 - Aa | 45° |
| Finger Sections 72 - Ab | 1° |
| Slot 70 - Ac | 4° |
| Diameter | |
| Bore 50 - D1 | 12.75 mm/.502 in. |
| Spacer Portion 44 - D2 | 14.35 mm/.565 in. @ tapered section 46 to 14.48 mm/.570 in. @ edges 74. |
| Untapered Sections 55 - D3 | [1](a) 15.37 mm/.605 in. [2](b) 15.52 mm/.611 in. |
| Tapered Ribs 56 (Max) D5 | [1](a) 15.55 mm/.612 in. [2](b) 15.70 mm/.618 in. |
| Flared Edges 74 - D6 | [1](a) 15.37 mm/.605 in. [2](b) 15.52 mm/.611 in. |
| Wall Thickness | |
| Spacer Portion 44 - t1 | 0.8 mm/.03 in. |
| Untapered Sections 55 - t2 | 1.31 mm/.05 in. |
| Ribs 56 (Max.) t3 | 1.40 mm/.055 in. |
| Slot Side Lengths | |
| Slot Side 76 - L1 | 9.00 mm/.354 in. |
| Slot Side 78 - L2 | 8.0 mm/.314 in. |
| Slot Widths | |
| Inner End - W1 | 0.75 mm/.029 in. |
| Outer End - W2 | 1.25 mm/.049 in. |
| Pitch | |
| Helical Edges 74 - P | 2.5 mm/0.100 inches |

[1]Prior to assembly of bushing 24 onto fastener 22.
[2]After Assembly of bushing 24 onto fastener 22.

The above dimensions are by way of example only and it should be understood that reasonable manufacturing tolerances would apply and that the dimensions could be varied depending on the application and overall size of the components.

In one form of the invention as dimensioned above, the taper of the ribs 56 was selected relative to the diameter of opening 16 with a designed interference between around 0.001 to around 0.020 inches; this provides the desired snug fit while permitting relative rotation and inhibiting wear, chafing, squeaking, and rattling of the fastener and bushing assembly 10 as assembled with the pivot members 12 and 14.

While being described herein and heretofore with reference to seat assemblies having reclining seat backs, the fastener and bushing assembly 10 of the present invention has many other useful applications. First, the fastener and bushing assembly 10 can be used as pivot joints in any assembly where a rotational bearing surface is required. Additionally, the fastener and bushing assembly 10 can be used as a pivot joint where a retained preload or friction is required to inhibit free, loose motion of the pivot joint. Furthermore, the fastener and bushing assembly 10 can be used as a pivot joint where bearing material is required to eliminate squeaks and rattles at the joint by providing a snug fit inside the mating hole. Numerous other applications as evident from the description herein are also within the scope of the fastener and bushing assembly 10 of the present invention.

As noted the present invention can be utilized with bushings, such as bushing 24 with one slot or more than two slots such as slots 70. In these cases the overall dimensions including the pitch P for bushings of generally the same size as bushing 24 would be approximately the same as that for the bushing 24. As to the pitch P, one of the main considerations, of course, is that the appropriate helical contour be provided at the outer edge(s) such as edges 74 to facilitate flaring while retaining resilience to the resultant flared washer-like structure 62.

A modified form of the invention to provide a pivot connection for pivot members having multiple spaced wall sections is shown in FIGS. 6–10. In the description of the embodiment of FIGS. 6–10 components similar to like components in the embodiment of FIGS. 1–5 have been given the same numeral designation with the addition of the postscript "a" and unless described otherwise can be considered to be essentially of the same construction and function as the similarly numbered components of the embodiment of FIGS. 1–5.

Figure 6:
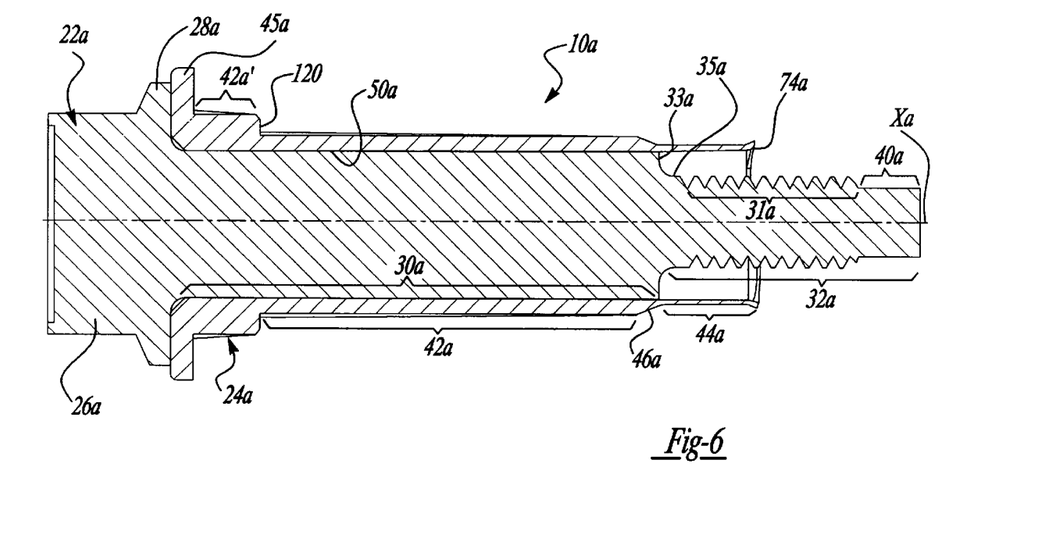
FIG. 6 is a side elevational, sectional side view of another form of the fastener and bushing assembly for pivotally securing pivot members with multiple, spaced wall sections constructed according to the present invention.
Figure 7:
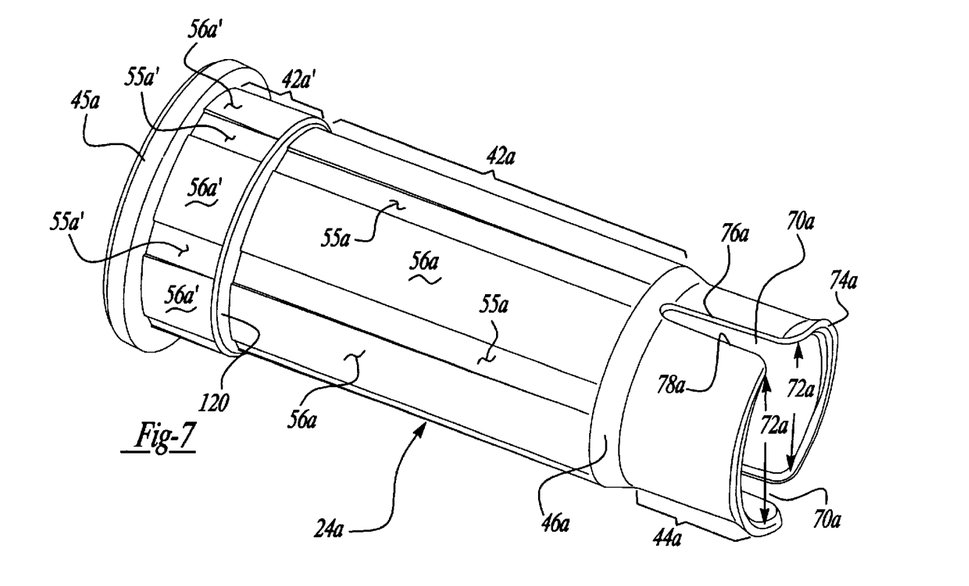
FIG. 7 is a pictorial view of the bushing of FIG. 6.
Figure 8:
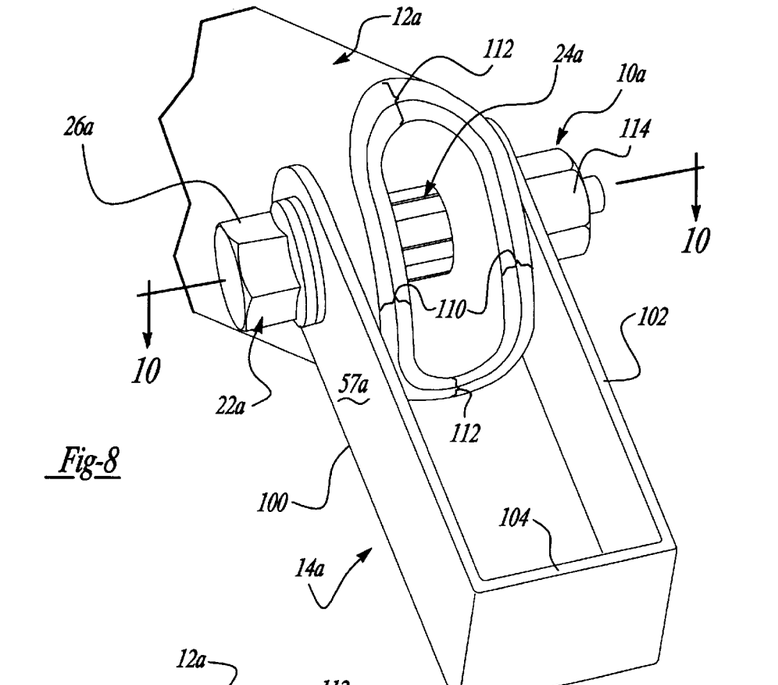
FIG. 8 is a pictorial view of the embodiment as illustrated in FIGS. 6 and 7 of the fastener and bushing assembly pivotally connecting the pivot members upon final installation.
Figure 9:
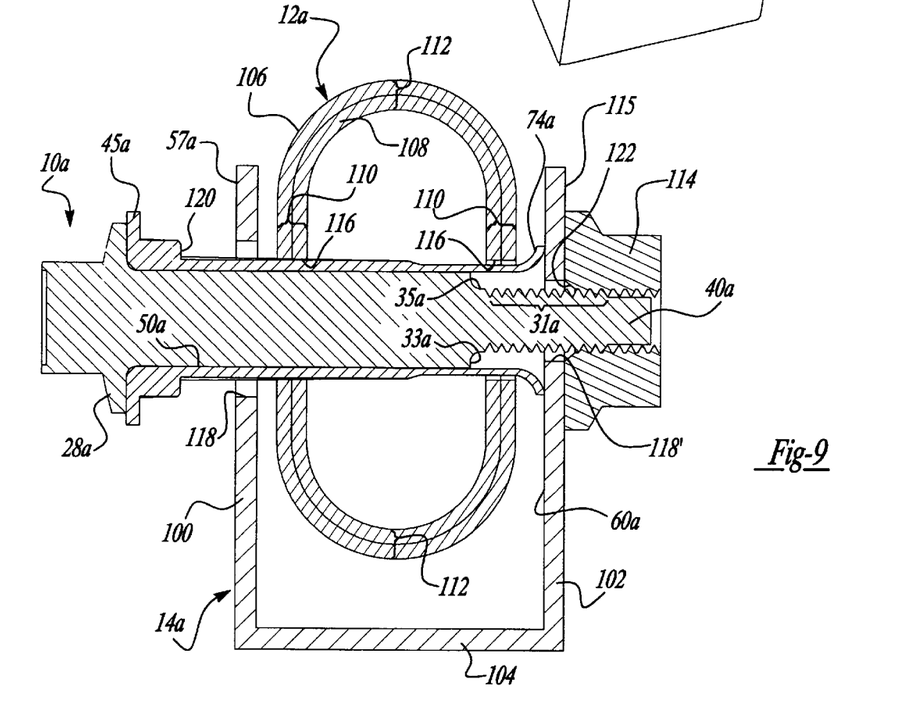
FIG. 9 is a side elevational, sectional view generally of the embodiment of the fastener and bushing assembly shown securing pivot members with multiple spaced walls and taken generally along the lines 10—10 in FIG. 8 but at the initiation of installation and with the bushing being initially flared.
Figure 10:
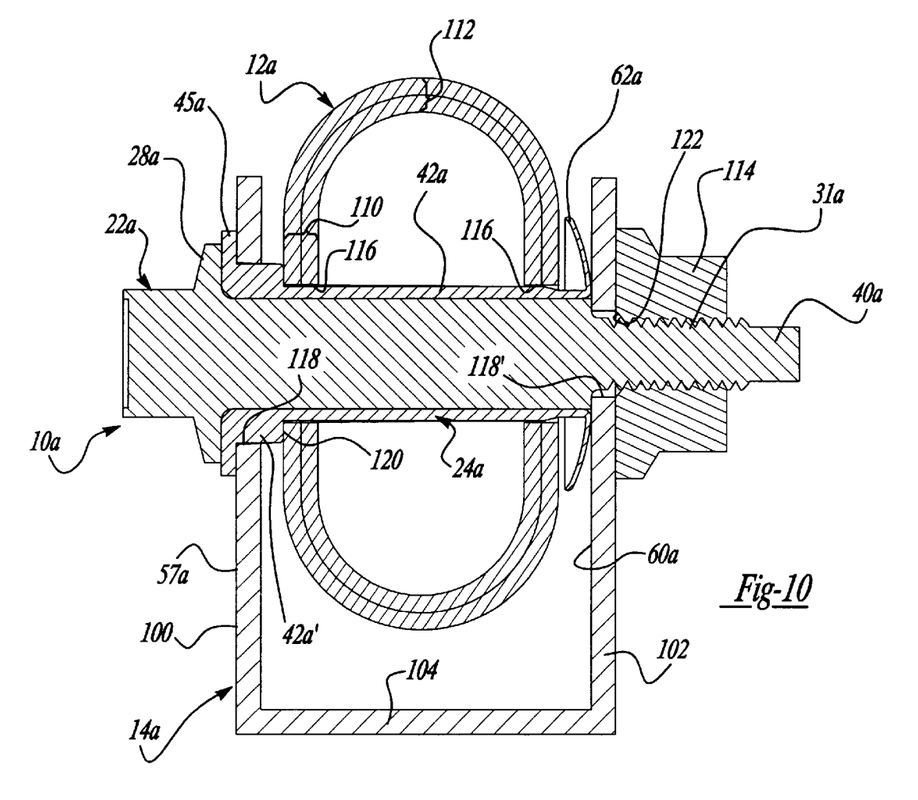
FIG. 10 is a side elevational, sectional view of the embodiment of the fastener and bushing assembly shown securing pivot members with multiple, spaced walls and taken along the lines 10—10 in FIG. 8 and illustrating the bushing as fully flared upon the final installation condition as shown in FIG. 8.

Looking now to FIGS. 6 and 7, a fastener and bushing assembly 10a is shown for pivotally securing a pair of members 12a and 14a in a manner as shown in FIGS. 8–10.

Looking now to FIGS. 8–10, here the pivot member 14a is of a generally U-shaped configuration and includes a pair of spaced wall sections 100 and 102 which are open at one end and connected together by a cross-member 104. The pivot member 12a is adapted to be located between the spaced wall sections 100 and 102 at their open end. The pivot member 12a has an enclosed configuration and includes an outer oblong shell 106 and an inner oblong shell 108 tightly nested and secured in shell 106, as by welding or fasteners. The generally oblong contour of the pivot member 12a is defined by generally straight, spaced wall sections 110 terminating in arcuate wall sections 112 at opposite ends. The pivot member 14a has a pair of axially aligned, punched, drilled or extruded smooth openings 118 and 118' extending through the straight wall sections 100 and 102, respectively. The bore 118' through wall section 102 is of a smaller diameter than bore 118 through wall section 100. A weld nut 114 is welded to the outer surface 115 of wall section 102 in co-axial alignment with bore 118'. The pivot member 12a has a pair of axially aligned openings 116 of generally uniform diameter through straight wall sections 110. The pivot members 12a and 14a are pivotally secured together by aligning the openings 118 and 118' of pivot member 14a with openings 116 of pivot member 12a and inserting the fastener and bushing assembly 10 therethrough whereby the pivot members 12a and 14a can pivot with respect to each other.

Referring now to FIGS. 6 and 7, the fastener and bushing assembly 10a of the present invention includes a fastener 22a and a bushing 24a. The fastener 22a as shown is a shoulder bolt type of generally the same overall configuration and material structure as fastener 22 of the embodiment of FIGS. 1–5. Thus fastener 22a has a longitudinal axis Xa with a head portion 26a with an enlarged diameter flange 28a. A substantially cylindrical smooth shank, support portion 30a extends outwardly from the flange 28a and a substantially cylindrical threaded shank portion 32a extends outwardly from the shank support portion 30a. The shank support portion 30a is of a greater diameter than the threaded portion 32a whereby a stepped, outer construction is provided defining an inner bolt shoulder 33a.

The head portion 26a of the fastener 22a has a hexagonally shaped outer surface 34a to facilitate being gripped by a standard hex socket tool for installation.

The threaded section 31a of threaded shank portion 32a of the fastener 22a is connected to the shoulder 33a by a smooth unthreaded section 35a and terminates at its outer end in a reduced diameter section 40a which provides clearance with the thread of weld nut 114 while facilitating insertion and threaded engagement of the threads of threaded section 31a. The weld nut 114 has an enlarged tapered counterbore 122 at its inner end adapted to receive in clearance relationship a portion of the smooth unthreaded section 35a of threaded portion 32a.

The bushing 24a is preferably a substantially hollow, generally cylindrical plastic member having a through bore 50a of generally uniform diameter. The bushing 24a is of a stepped, outer construction and has a small diameter first main bushing support portion 42a connected to a larger diameter second main bushing support portion 42a' at one end and to a reduced diameter bushing spacer portion 44a at its other, outer end. The second main bushing portion 42a' terminates at a flange 45a at its inner end. The bushing spacer portion 44a is of a reduced outside diameter relative to the larger outside diameter of the first main bushing portion 42a and is connected thereto by a tapered transition section 46a. At the same time the outside diameter of the first bushing portion 42a is smaller than the diameter of the second main bushing portion 42a' whereby a bushing shoulder 120 is defined therebetween. Thus the radial wall thickness of the bushing spacer portion 44a is less than the wall thicknesses of both the first bushing support portion 42a and the second bushing support portion 42a'. The wall thickness of the bushing spacer portion 44a is selected to facilitate flaring, as will be described, while the greater wall thicknesses of the first bushing support portion 42a and second bushing support portion 42a' are selected to provide adequate strength to accept the bearing loads from the associated pivot members 12a and 14a.

The bushing spacer portion 44a is substantially the same as bushing spacer portion 44 of FIGS. 1–5 and as such has a pair of axially extending, diametrically opposed slots 70a dividing the spacer portion 44a into two generally semi-cylindrical finger sections 72a. The outer ends of the finger sections 72a terminate in radially outwardly flared or angulated lips or edges 74a. As with finger sections 72, the finger sections 72a are inclined slightly radially outwardly from the transition section 46a. Also, as with the lips or edges 74, the lips or edges 74a flare radially outwardly and also extend helically with the helical contour resulting in a first slot side 76a extending axially for a length which is greater than the axial length of the second slot side 78a and with the difference in length defining the pitch. (See FIGS. 6 and 7). At the same time the slot sides 76a and 78a also extend axially outwardly equi-angularly from the axis to define an included angle, such as angle Ac in the embodiment of FIGS. 1–5. Thus the width of each of the slots 70a increases from its axially inner end to its outer end at lips or edges 74a. The above construction facilitates each of the finger sections 72a in flaring radially outwardly and peeling axially rearwardly during installation as the flared edges 74a gradually engage the confronting surface 60a from the end of the first slot side 76a at one of the slots 70a to the second slot side 78a at the other slot 70a. In addition, the slight angle of radial inclination of finger sections 72a also facilitates molding of the bushing 24a.

To assemble the fastener 22a and bushing 24a of the present invention, the fastener 22a is inserted into the bore 50a of bushing 24a with the bolt flange 28a in engagement with the bushing flange 45a. Preferably, the diameter of bore 50a especially in the first and second main bushing portions 42a and 42a' is uniform and slightly less than the diameter of the fastener shank support portion 30a such that the bushing 24a is press-fitted onto the fastener support portion 30a of the fastener 22a with a tight interference or frictional fit to inhibit loose, undesired rotation of the bushing 24a about the fastener support portion 30a. At the same time, the magnitude of interference of the press fit is provided such that the bushing 24a can withstand at least a three (3 lb.) pound static load along the longitudinal axis Xa of the fastener 22a without shifting or otherwise changing its axial position in relation to the fastener 22a. This facilitates handling of the fastener and bushing assembly 10a during installation and also inhibits rotation of the bushing 24a relative to the fastener 22a when the pivot member 12a is pivoted relative to the pivot member 14a.

The axial length of the fastener support portion 30a is generally no less than the combined axial length of the bushing flange 45a and the first and second main bushing portions 42a and 42a'. As will be seen, in this way engagement of the bolt shoulder 33a with the confronting surface 60a, of the pivot member 14a can occur upon installation of the fastener and bushing assembly 10a with the radially outwardly flaring of the bushing spacer portion 44a to be described.

Looking now to FIG. 7 the first and second bushing support portions 42a and 42a' preferably have a plurality of axially extending, equally circumferentially spaced ribs 56a and 56a', respectively, formed along their outer surfaces. The ribs 56a are tapered from a point adjacent the transition section 46a from the small diameter of the intervening untapered sections 55a to a larger diameter at bushing shoulder 120 while the ribs 56a' are tapered from a point adjacent the bushing shoulder 120 from the small diameter of the intervening untapered sections 55a' to a larger diameter at a point adjacent the bushing flange 45a. At the same time the ribs 56a, 56a' will increase in thickness from the beginning small diameter to the larger end diameter.

The fastener and bushing assembly 10a is mounted to the pivot members 12a and 14a via the aligned openings 116 and 118, 118' of the pivot members 12a and 14a, respectively.

Looking now to FIGS. 9 and 10, the threaded shank portion 32a of fastener 22a, the first and second bushing support portions 42a, 42a' and spacer portion 44a are moved through the smooth bores 116 and 118 of pivot members 12a and 14a. The diameter of the inclined edges or lips 74a is less than the diameter of smooth bores 116 and 118 and hence are moved therethrough in a clearance relationship. At the same time, as previously noted, the reduced diameter section 40a of the fastener 22a facilitates initiation of threaded engagement between the threads of the fastener threaded portion 32a and the weld nut 114.

As the fastener 22a is threaded into the threaded bore 20a, the first main bushing support portion 42a of the bushing 24a is moved into engagement with the two spaced smooth bores 116 of the wall sections 110 of the pivot member 12a while the second bushing support portion 42a' is moved into engagement with the, smooth bore 118 of the wall section 100 of pivot member 14a. The initial outside diameter of the ribs 56a, 56a', is generally no greater than the diameter of the respective smooth bores 116 and 118. However, the diameters of the ribs 56a and 56a' become greater than the diameters of the associated ones of the smooth bores 116 and 118; thus as the ribs 56a, 56a' are moved farther into the bores 116 and 118 an interference is developed such that when the bushing flange 45a engages the outer surface 57a of the pivot member 14a the interference provides a snug fit of the ribs 56a, 56a' with the bores 116 and 118. Once secured within the openings 116 and 118 of the pivot members 12a, 14a, the ribs 56a, 56a' of the bushing 24a, being formed of a resilient, plastic material, are under compression and flow into the untapered sections 55a, 55a' between the ribs 56a, 56a' thereby absorbing any manufacturing tolerances existing in the openings 116 and 118 of the pivot members 12a, 14a while providing a snug fit.

However, the resilience of the plastic material of the bushing 24a and its inherent lubricity will still permit the pivot member 12a to be selectively pivoted about the first bushing support portion 42a without the need for excessive force and with minimal wear between the first bushing support portion 42a and the bores 116 of pivot member 12a.

As illustrated in FIGS. 9 and 10, as the fastener and bushing assembly 10a is moved relative to the aligned openings 116 and 118 the inclined edges 74a, of bushing spacer portion 44a being greater than the diameter of the opening 118', will engage the confronting surface 60a of the pivot member 14a at an area spaced radially outwardly from the opening 118'. As this occurs, the tapered, helically extending outer edges 74a will engage the surface 60a and the relative axial compressive force applied to the bushing 24a will cause the helical edges 74a and the slots 70a formed in the spacer portion 44a, to flare radially outwardly from the axis Xa of the fastener 22a between the pivot members 12a and 14a. The initiation of such flaring between the wall section 102 and adjacent wall section 110 is shown in FIG. 9. The threaded portion 32a of fastener 22a is threaded farther into the weld nut 114 until the bolt shoulder 33a engages the surface 60a of the wall section 102 of the pivot member 14a. At this point the installation is completed and the bushing spacer portion 44a is fully flared (see FIG. 10). The diameter of the bore 118' in wall section 102 is slightly greater than the diameter of the threaded shank portion 32a including the unthreaded section 35a. In this regard the combined depth of the tapered counterbore 122 in weld nut 114 and thickness of the wall section 102 is selected to permit engagement of the bolt shoulder 33a with the surface 60a while preventing the unthreaded section 35a of the threaded shank portion 32a from engaging the threads of weld nut 114. The radially outward flaring of the bushing spacer portion 44a creates a resilient, washer-like structure 62a between the pivot members 12a and 14a which resiliently engages the surface 60a. At the same time by having the bolt shoulder 33a engage the surface 60a at the end of the installation a clamping force is applied between the weld nut 114 and wall section 102 to further secure the weld nut 114.

Thus it can be seen that the resultant resilient, washer-like structure 62a will bias the bushing 24a to maintain a fixed position between the pivot members 12a and 14a. In addition, in the event dimensional tolerances preclude the bolt shoulder 33a from engaging the surface 60a, the resilient bias created by the washer-like structure 62a will maintain its position between the pivot members 12a and 14a while also biasing the pivot members 12a and 14a to maintain their spaced relationship.

In this regard, it can be seen from FIG. 10 that the inner wall section 110 of pivot member 12a is closely adjacent to the washer-like structure 62a and to the surface 60a of wall section 102 of pivot member 14a. Thus the arcuate flare of the washer-like structure 62a will be effective in spacing that inner wall section 110 from the surface 60a and in resiliently inhibiting their engagement. At the same time the length of the second bushing support portion 42a' is greater than the thickness of wall section 100 whereby the bushing shoulder 120 will space the other wall section 110 from engaging the wall section 100.

In this regard the resilient bias created by the washer-like structure 62a will also assist in maintaining loading between the engaged threads of the threaded fastener portion 32a and the weld nut 114 to inhibit loosening.

In addition the engagement of the openings 116 of pivot member 12a with the ribs 56a of the first main bushing portion 42a, the engagement of the opening 118 of the pivot member 14a with the ribs 56a' of the second main bushing portion 42a', the engagement of wall section 100 of pivot member 14a with bushing flange 45a, the resilient engagement of the washer-like structure 62a with the surface 60a of wall section 102 of pivot member 14a and the lubricity of the plastic material inhibits squeaking, rattling and the like between the pivot members 12a and 14a.

While the pivot member 12a is shown to be an oblong structure with spaced wall sections 110 it should be understood that the assembly of pivot members could be designed with pivot member 12a being of a single wall section located on the first bushing support portion 42a between the wall sections such as sections 100 and 102 of pivot member 14a. Other variations and arrangements of pivot members are, of course, also within the scope of the present invention.

Figure 11:
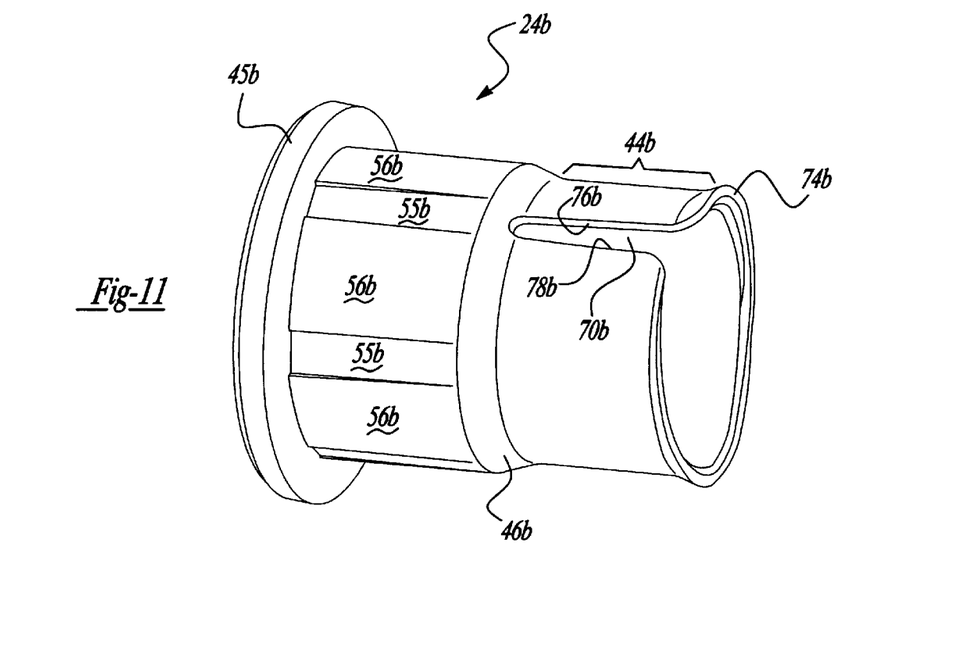
FIG. 11 is a pictorial view of a modified form of bushing.

In a modification of the embodiment of FIGS. 1–5 a bushing, as shown in FIG. 11, is utilized having only one axially extending slot but is otherwise substantially the same as bushing 24 for use with a fastener 22. In the description of the embodiment of FIG. 11 components of bushing 24b similar to like components of the bushing 24 in the embodiment of FIGS. 1–5 have been given the same numeral designation with the addition of the postscript "b" and unless described otherwise can be considered to be essentially of the same construction and function as the similarly numbered components of the embodiment of FIGS. 1–5.

The bushing 24b is a substantially hollow, generally cylindrical member having a through bore 50b of generally uniform diameter. The bushing 24b has a main bushing support portion 42b at its inner end which is connected to a bushing spacer portion 44b at its outer end. The main bushing portion 42b has a flange 45b at its inner end. The bushing spacer portion 44b is of a reduced outside diameter relative to the larger outside diameter of the main bushing portion 42b and is connected thereto by a tapered transition section 46b. Thus the wall thickness of the bushing spacer portion 44b is less than wall thickness of bushing support portion 42b. The wall thickness of the bushing spacer portion 44b is selected to facilitate flaring, as will be described, while the greater wall thickness of bushing support portion 42b is selected to provide adequate strength to accept the bearing loads from the associated pivot member.

Thus the bushing 24b is substantially identical to bushing 24 except that the bushing spacer portion 44b has one axially extending slot 70b. Thus the outer end of the bushing spacer portion 44b terminates in a radially outwardly flared or angulated lip or edge 74b. The bushing spacer portion 44b is inclined radially outwardly from the transition section 46b at a slight included angle whereby the outside diameter will increase slightly from the transition section 46b to the beginning of the lip or edge 74b. The lip or edge 74b is angulated to flare radially outwardly to a larger diameter. The lip or edge 74b extends helically with the helical contour resulting in the slot 70b having a first slot side 76b and a second slot side 78b with the first slot side 76b extending axially for a length which is greater than the axial length of the second slot side 78b. At the same time the slot sides 76b and 78b also extend axially outwardly equiangularly to define an included angle such as angle Ac in FIGS. 1–5. Thus the width of the slot 70b increases from its inner end to its outer end. The above construction facilitates the lip or edge 74b in flaring radially outwardly and peeling axially rearwardly during installation as the flared edge 74b gradually engages the confronting surface of the associated pivot member from the end of the first slot side 76b to the second slot side 78b. The pitch P of the helical edge 74b is generally the same as that of the helical edges 74 of the bushing 24. The bushing 24b would be utilized with a fastener such as fastener 22 as shown in FIGS. 1–5. At the same time the single slot construction of the spacer portion 44b could also be used with the form of the bushing 24a in the embodiment of FIGS. 6–10.

While it will be apparent that the preferred embodiments of the invention disclosed are well calculated to fulfill the objects stated above, it will be appreciated that the invention is susceptible to modification, variation and change without departing from the proper scope or fair meaning of the invention.

What is claimed is:

1. A pivot joint fastening assembly for pivotally connecting members including a first member and a second member, the first and second members being spaced from each other and having alignable openings therethrough, the fastening assembly comprising:
   a fastener having a longitudinal axis,
   a bushing adapted to be secured to said fastener,
   said bushing having a spacer portion at one end;
   said fastening assembly being adapted to be mounted within the aligned openings of the first and second members with said spacer portion adapted to be located between the first and second members and engageable with a confronting surface of the second member,
   said spacer portion of said bushing having a flaring structure adapted to flare radially outwardly upon compressive engagement with the confronting surface of the second member to define a washer-like engagement structure between the first and second members during installation with said engagement structure locating and resiliently maintaining the axial position of said bushing on said fastener,
   said flaring structure terminating in an edge adapted to engage the confronting surface and to move radially outwardly to a final position radially spaced and separated from the remainder of said flaring structure.

2. The fastening assembly of claim 1 with the opening through the first member being greater than the opening through the confronting surface of the second member, said spacer portion being of a size to move through the opening of the first member but not through the opening of the confronting surface of the second member.

3. The fastening assembly of claim 1 wherein said bushing has a main bushing portion adjacent the end of said bushing opposite from said spacer portion, said main bushing portion having an outer diameter generally greater than the outer diameter of said spacer portion and of a size to fit matingly within the opening of the first member.

4. The fastening assembly of claim 3 wherein said main bushing portion has an inner diameter generally equal to the inner diameter of said spacer portion.

5. The fastening assembly of claim 1 with said flaring structure of said spacer portion comprising the outer edge of said spacer portion being formed to extend helically.

6. The fastening assembly of claim 1 with said flaring structure of said spacer portion comprising the outer edge of said spacer portion being formed to extend helically and with said outer edge extending axially, radially outwardly.

7. The fastening assembly of claim 1 with said fastener adapted to be secured to the second member with said engagement structure locating and resiliently maintaining the axial position of said bushing between said fastener and the second member.

8. The fastening assembly of claim 1 with said flaring structure of said spacer portion comprising a generally axially extending open slot in said spacer portion.

9. A pivot joint fastening assembly for pivotally connecting members including a first member and a second member, the first and second members being spaced from each other and having alignable openings therethrough, the fastening assembly comprising:
   a fastener having a longitudinal axis,
   a bushing adapted to be secured to said fastener,
   said bushing having a spacer portion at one end;
   said fastening assembly being adapted to be mounted within the aligned openings of the first and second members with said spacer portion adapted to be located between the first and second members and engageable with a confronting surface of the second member,
   said spacer portion of said bushing having a flaring structure adapted to flare radially outwardly upon compressive engagement with the confronting surface of the second member to define a washer-like engagement structure between the first and second members during installation with said engagement structure locating and resiliently maintaining the axial position of said bushing on said fastener,
   said flaring structure of said spacer portion comprising a generally axially extending open slot in said spacer portion,
   said slot has a first slot side and a second slot side, and further comprising an edge extending around said spacer portion of said bushing from said first slot side to said second slot side, said first slot side having a length greater than a length of said second slot side whereby said edge has a substantially helical configuration.

10. The fastening assembly of claim 1, with said flaring structure of said spacer portion comprising a plurality of generally axially extending open slots in said spacer portion.

11. A pivot joint fastening assembly for pivotally connecting members including a first member and a second member, the first and second members being spaced from each other and having alignable openings therethrough, the fastening assembly comprising:
   a fastener having a longitudinal axis, a bushing adapted to be secured to said fastener, said bushing having a spacer portion at one end;

said fastening assembly being adapted to be mounted within the aligned openings of the first and second members with said spacer portion adapted to be located between the first and second members and engageable with a confronting surface of the second member, said spacer portion of said bushing having a flaring structure adapted to flare radially outwardly upon compressive engagement with the confronting surface of the second member to define a washer-like engagement structure between the first and second members during installation with said engagement structure locating and resiliently maintaining the axial position of said bushing on said fastener, said flaring structure of said spacer portion comprising a plurality of generally axially extending open slots in said spacer portion, each of said slots has a first slot side and a second slot side, and further comprising an edge extending around said spacer portion of said bushing from said first slot side of one of said slots to said second slot side of an adjacent slot, said first slot side having a length greater than the length of said second slot side of said adjacent slot wherein each of said edges has a substantially helical configuration.

12. The fastening assembly of claim 3 and further comprising at least one rib formed along the outer surface of said main bushing portion with at least a portion of said rib having an outer diameter greater than the diameter of the opening of the first member.

13. The fastening assembly of claim 3 wherein said bushing has a plurality of generally axially extending ribs formed along the outer surface of said main bushing portion with at least a portion of said ribs having an outer diameter greater than the diameter of the opening of the first member and further wherein said ribs are generally equally circumferentially spaced from each other.

14. The fastening assembly of claim 13 wherein said ribs when under compression in the opening of the first member are flowable to an area between said ribs to absorb manufacturing tolerance variations with that opening.

15. A pivot joint fastening assembly for pivotally connecting members including a first member and a second member, the first and second members being spaced from each other and having alignable openings therethrough, the fastening assembly comprising:

a fastener having a longitudinal axis, a bushing adapted to be secured to said fastener, said bushing having a spacer portion at one end;

said fastening assembly being adapted to be mounted within the aligned openings of the first and second members with said spacer portion adapted to be located between the first and second members and engageable with a confronting surface of the second member, said spacer portion of said bushing having a flaring structure adapted to flare radially outwardly upon compressive engagement with the confronting surface of the second member to define a washer-like engagement structure between the first and second members during installation with said engagement structure locating and resiliently maintaining the axial position of said bushing on said fastener, said bushing being constructed from a thermoplastic material.

16. A pivot joint fastening assembly for pivotally connecting members including a first member and a second member, the first and second members being spaced from each other and having alignable openings therethrough, the fastening assembly comprising:

a fastener having a longitudinal axis, a bushing adapted to be secured to said fastener, said bushing having a spacer portion at one end;

said fastening assembly being adapted to be mounted within the aligned openings of the first and second members with said spacer portion adapted to be located between the first and second members and engageable with a confronting surface of the second member, said spacer portion of said bushing having a flaring structure adapted to flare radially outwardly upon compressive engagement with the confronting surface of the second member to define a washer-like engagement structure between the first and second members during installation with said engagement structure locating and resiliently maintaining the axial position of said bushing on said fastener, said bushing being securable to said fastener to maintain relative rotational positioning with said fastener upon mounting of said bushing onto said fastener and in response to pivotal movement between the first and second members.

17. The fastening assembly of claim 1 with the first member having a single first wall section and the second member having a single second wall section with the alignable openings extending through the first and second wall sections and with the second wall section including the confronting surface, the opening through the first wall section being greater than the opening through the second wall section, said bushing having a main bushing portion adjacent the end of said bushing opposite from said spacer portion, said main bushing portion having an outer diameter generally greater than the outer diameter of said spacer portion and of a size to fit matingly within the opening of the first wall section of the first member, said spacer portion being of a size to move through the opening of the first wall section but not through the opening of the second wall section whereby said flaring structure of said spacer portion will be engageable with the confronting surface.

18. The fastening system of claim 1 with the first member having a pair of axially spaced first wall sections and with the second member having a pair of axially spaced second wall sections located between the spaced first wall sections, the alignable openings extending through the first and second wall sections with one of the first wall sections having the confronting surface and with the opening of the one first wall section being smaller than the other alignable openings, said bushing having a main bushing portion having an outer diameter generally greater than the outer diameter of said spacer portion and of a size to fit matingly within the larger openings of the first and second wall sections but not within the smaller opening of the one first wall section, said spacer portion being of a size to move through the larger openings of the first and second wall sections but not through the smaller opening of the one first wall section whereby said flaring structure will be engageable with the confronting surface.

19. A pivot joint fastening assembly for pivotally connecting members including a first member and a second member, the first and second members being spaced from each other and having alignable openings therethrough, the fastening assembly comprising:

a fastener having a longitudinal axis, a bushing adapted to be secured to said fastener, said bushing having a spacer portion at one end;

said fastening assembly being adapted to be mounted within the aligned openings of the first and second members with said spacer portion adapted to be located between the first and second members and engageable with a confronting surface of the second member, said spacer portion of said bushing having a flaring structure adapted to flare radially outwardly upon compressive engagement with the confronting surface of the second member to define a washer-like engagement structure between the first and second members during installation with said engagement structure locating and resiliently maintaining the axial position of said bushing on said fastener, the first member having a single first wall section and the second member having a single second wall section with the alignable openings extending through the first and second wall sections and with the second wall section including the confronting surface, the opening through the first wall section being greater than the opening through the second wall section, said bushing having a main bushing portion adjacent the end of said bushing opposite from said spacer portion, said main bushing portion having an outer diameter generally greater than the outer diameter of said spacer portion and of a size to fit matingly within the opening of the first wall section of the first member, said spacer portion being of a size to move through the opening of the first wall section but not through the opening of the second wall section whereby said flaring structure of said spacer portion will be engageable with the confronting surface, said flaring structure of said spacer portion comprising a plurality of generally axially extending open slots in said spacer portion, each of said slots has a first slot side and a second slot side, and further comprising an edge extending around said spacer portion of said bushing from said first slot side of one of said slots to said second slot side of an adjacent slot, said first slot side having a length greater than the length of said second slot side of said adjacent slot wherein each of said edges has a substantially helical configuration.

20. A pivot joint fastening openings, and with the opening of the other first wall section being larger than the openings through the second wall sections, said bushing having a main bushing portion adjacent the end of said bushing opposite from said spacer portion, said main bushing portion having first and second bushing portions each having an outer diameter generally greater than the outer diameter of said spacer portion, said first bushing portion having a large diameter of a size to fit matingly within the opening of the other first wall section, said second bushing portion being of a smaller diameter of a size to fit matingly within the openings of the second wall sections, said spacer portion being of a size to move through the opening of the other first wall section and the openings of the second wall sections but not through the smaller opening of the one first wall section whereby said flaring structure will be engageable with the confronting surface.

21. The fastening system of claim 20 with said main bushing portion having a radial shoulder at the juncture of said first and second bushing portions with the axial length of said first bushing portion being selected to maintain the first and second wall sections in axially spaced relationship.

22. The fastening assembly of claim 20, with said flaring structure of said spacer portion comprising a plurality of generally axially extending open slots in said spacer portion, each of said slots has a first slot side and a second slot side, and further comprising an edge extending around said spacer portion of said bushing from said first slot side of one of said slots to said second slot side of an adjacent slot, said first slot side having a length greater than the length of said second slot side of said adjacent slot wherein each of said edges has a substantially helical configuration.

23. A pivot joint fastening assembly for pivotally connecting members including a first member and a second member, the first and second members being spaced from each other and having alignable openings therethrough, the fastening assembly comprising:

a fastener having a longitudinal axis, a bushing adapted to be secured to said fastener, said bushing having a spacer portion at one end;

said fastening assembly being adapted to be mounted within the aligned openings of the first and second members assembly for pivotally connecting members including a first member and a second member, the first and second members being spaced from each other and having alignable openings therethrough, the fastening assembly comprising:

a fastener having a longitudinal axis, a bushing adapted to be secured to said fastener, said bushing having a spacer portion at one end;

said fastening assembly being adapted to be mounted within the aligned openings of the first and second members with said spacer portion adapted to be located between the first and second members and engageable with a confronting surface of the second member, said spacer portion of said bushing having a flaring structure adapted to flare radially outwardly upon compressive engagement with the confronting surface of the second member to define a washer-like engagement structure between the first and second members during installation with said engagement structure locating and resiliently maintaining the axial position of said bushing on said fastener, the first member having a pair of axially spaced first wall sections and with the second member having a pair of axially spaced second wall sections located between the spaced first wall sections, the alignable openings extending through the first and second wall sections with one of the first wall sections having the confronting surface and with the opening of the one first wall section being smaller than the other alignable with said spacer portion adapted to be located between the first and second members and engageable with a confronting surface of the second member, said spacer portion of said bushing having a flaring structure adapted to flare radially outwardly upon compressive engagement with the confronting surface of the second member to define a washer-like engagement structure between the first and second members during installation with said engagement structure locating and resiliently maintaining the axial position of said bushing on said fastener, the first member having a pair of axially spaced first wall sections and with the second member located between the spaced first wall sections, the alignable openings extending through the first wall sections and the second member with one of the first wall sections having the confronting surface and with the opening of the one first wall section being smaller than the other alignable openings, said bushing having a main bushing portion adjacent the end of said bushing opposite from said spacer portion, said main bushing portion having first and second bushing portions each having an outer diameter generally greater than the outer diameter of said spacer portion, said first bushing portion having a large diameter of a size to fit matingly within the opening of the other first wall section, said second bushing portion being of a smaller diameter to fit matingly within the opening of the second member, said spacer portion being of a size to move through the opening of the other first wall section and the opening of the second member but not through the smaller opening of the first wall section whereby said flaring structure will be engageable with the confronting surface.

24. The fastening system of claim 23 with said main bushing portion having a radial shoulder at the juncture of said first and second bushing portions with the axial length of said first bushing portion being selected to maintain the first wall sections and the second pivot member in axially spaced relationship.

25. The fastening assembly of claim 23, with said flaring structure of said spacer portion comprising a plurality of generally axially extending open slots in said spacer portion, each of said slots has a first slot side and a second slot side, and further comprising an edge extending around said spacer portion of said bushing from said first slot side of one of said slots to said second slot side of an adjacent slot, said first slot side having a length greater than the length of said second slot side of said adjacent slot wherein each of said edges has a substantially helical configuration.

26. A method for pivotally fastening members including a first member to a second member, the first and second members having alignable openings therethrough, the method comprising:

providing a fastener having a longitudinal axis, providing a bushing having a spacer portion at one end, forming said spacer portion of said bushing to flare radially outwardly in response to a relative axial compressive force applied to said spacer portion, mounting said bushing to said fastener for forming a fastening assembly, mounting the fastening assembly within the aligned openings of the first and second members with said spacer portion of said bushing located between the first and second members and engageable with a confronting surface of the second member, applying a relative axial compressive force to said bushing with said spacer portion in engagement with the confronting surface of the second member thereby flaring said spacer portion radially outwardly from the longitudinal axis of said fastener and between the first and second members to form a washer-like engagement structure locating and resiliently maintaining the axial position of said bushing on said fastener, forming said spacer portion to terminate in an edge adapted to engage the confronting surface and to move radially outwardly to a final position radially spaced and separated from the remainder of said spacer portion, said relative axial compressive force being applied by said fastener in installing said fastening assembly with the first and second members.

27. The method of claim 26 with said fastener adapted to be secured to the second member and with said relative axial compressive force being applied in securing said fastener to the second member.

28. The method of claim 26, further comprising providing said bushing with a main bushing portion adjacent the end of said bushing opposite from said spacer portion, and providing said main bushing portion with an outer diameter greater than the outer diameter of said spacer portion, said diameter of said spacer portion permitting said spacer portion to move through the opening of the first member while not permitting movement through the opening of the confronting surface of the second member.

29. The method of claim 26 further comprising forming the outer end of said spacer portion with a helically extending edge to assist flaring.

30. The method of claim 26 further comprising forming the outer end of said spacer portion with a helically extending edge to assist flaring and with said edge extending axially, radially outwardly.

31. The method of claim 26 further comprising forming said spacer portion of said bushing with a generally axially extending slot to assist flaring.

32. A method for pivotally fastening members including a first member to a second member, the first and second members having alignable openings therethrough, the method comprising:

providing a fastener having a longitudinal axis, providing a bushing having a spacer portion at one end, forming said spacer portion of said bushing to flare radially outwardly in response to a relative axial compressive force applied to said spacer portion, mounting said bushing to said fastener to form a fastening assembly, mounting the fastening assembly within the aligned openings of the first and second members with said spacer portion of said bushing located between the first and second members and engageable with a confronting surface of the second member, applying a relative axial compressive force to said bushing with said spacer portion in engagement with the confronting surface of the second member thereby flaring said spacer portion radially outwardly from the longitudinal axis of said fastener and between the first and second members to form a washer-like engagement structure locating and resiliently maintaining the axial position of said bushing on said fastener, said relative axial compressive force being applied by said fastener in installing said fastening assembly with the first and second members, forming said spacer portion of said bushing with a generally axially extending slot to assist flaring, forming said slot with a first slot side and a second slot side, and further comprising extending an edge around said spacer portion of said bushing from said first slot side to said second slot side, said first slot side having a length greater than the length of said second slot side wherein said edge has a substantially helical configuration.

33. The method of claim 26 further comprising forming said bushing with a plurality of axially extending slots in said spacer portion to assist flaring.

34. A method for pivotally fastening members including a first member to a second member, the first and second members having alignable openings therethrough, the method comprising:

providing a fastener having a longitudinal axis, providing a bushing having a spacer portion at one end, forming said spacer portion of said bushing to flare radially outwardly in response to a relative axial compressive force applied to said spacer portion, mounting said bushing to said fastener to form a fastening assembly, mounting the fastening assembly within the aligned openings of the first and second members with said spacer portion of said bushing located between the first and second members and engageable with a confronting surface of the second member, applying a relative axial compressive force to said bushing with said spacer portion in engagement with the confronting surface of the second member thereby flaring said spacer portion radially outwardly from the longitudinal axis of said fastener and between the first and second members to form a washer-like engagement structure locating and resiliently maintaining the axial position of said bushing on said fastener, said relative axial compressive force being applied by said fastener in installing said fastening assembly with the first and second members, forming said bushing with a plurality of axially extending slots in said spacer portion to assist flaring, forming each of said slots with a first slot side and a second slot side, and further comprising extending an edge around said spacer portion of said bushing from said first slot side of one of said slots to said second slot side of an adjacent slot, said first slot side having a length greater than the length of said second slot side of said adjacent slot wherein each of said edges has a substantially helical configuration.

35. A fastening assembly for connecting members including a first member and a second member, the first and second members being spaced from each other and having alignable openings therethrough, the fastening assembly comprising:

a fastener having a longitudinal axis, a bushing adapted to be secured said fastener, said bushing having a spacer portion at one end;

said fastening assembly being adapted to be mounted within the aligned openings of the first and second members, said spacer portion being of a size to be located between the first and second members and engageable with a confronting surface of the second member, said bushing having a main bushing portion adjacent the end of said bushing opposite from said spacer portion, said main bushing portion having an outer diameter generally greater than the outer diameter of said spacer portion and of a size to fit matingly within the opening of the first member, said spacer portion having a flaring structure adapted to flare radially outwardly in response to a relative axial compressive force applied to said bushing, said flaring structure of said spacer portion comprising a plurality of generally axially extending open slots in said spacer portion defining a plurality of axially extending finger sections, each of said slots having a first slot side and a second slot side, and further comprising an edge at the axially outer end of said finger sections extending around said spacer portion of said bushing from said first slot side of one of said slots to said second slot side of an adjacent slot, said first slot side having a length greater than the length of said second slot side of said adjacent slot wherein each of said edges has a substantially helical configuration, said finger sections of said spacer portion of said bushing flaring radially outwardly upon compressive engagement of said edges with the second member to define a washer-like engagement structure between the first and second members during installation with said engagement structure locating and resiliently maintaining the axial position of said bushing on said fastener.

36. The fastening assembly of claim 35 with said edges of said finger sections being radially outwardly angulated to facilitate the radially outward flaring of said finger sections.

37. The fastening assembly of claim 35 with said finger sections being inclined radially outwardly to facilitate their radial outward flaring.

38. The fastening assembly of claim 35 with said finger sections being inclined slightly radially outwardly and said edges of said finger sections being separately radially outwardly angulated to facilitate said radially outward flaring of said finger sections.

39. The fastening assembly of claim 35 with said fastener being a threaded bolt like member having a shank support portion adapted to matingly receive said main bushing portion to radially support said bushing, said fastener having an enlarged head portion at one end of said shank support portion and a reduced diameter threaded shank portion axially extending from the other end of said shank support portion, threaded connection means connected with the second member and adapted to threadably receive said threaded shank portion whereby said fastening assembly and the first and second members are connected together and with said relative axial compressive force being applied in threadably securing said fastener with the second member.

40. The fastening assembly of claim 39 with said bushing having an enlarged flange at the end of said main bushing portion with said flange adapted to engage the first member upon installation.

41. The fastening assembly of claim 35 with said main bushing portion having first and second bushing portions each having an outer diameter generally greater than the outer diameter of said spacer portion, said first bushing portion having a large diameter of a size to fit matingly within the opening of the first member, said second bushing portion being of a smaller diameter to fit matingly within an opening of the second member, said spacer portion being of a size to move through the opening of the first and second members but not through the opening of the first wall section whereby it will be engageable with the confronting surface, said fastener being a threaded bolt like member having a shank support portion adapted to matingly receive said main bushing portion to radially support said bushing, said fastener having an enlarged head portion at one end of said shank support portion and a reduced diameter threaded shank portion axially extending from the other end of said shank support portion, threaded connection means connected with the second member and adapted to threadably receive said threaded shank portion whereby said fastening assembly and the first and second members are connected together.

42. The fastening assembly of claim 41 with said bushing having an enlarged flange at the end of said main bushing portion with said flange adapted to engage the first member upon installation.

* * * * *